United States Patent [19]

Meenen

[11] 4,151,106

[45] Apr. 24, 1979

[54] PROCESS FOR THE PREPARATION OF UNIFORM, STABLE DIACYL PEROXIDE COMPOSITION

[75] Inventor: Günter Meenen, Emmerich, Fed. Rep. of Germany

[73] Assignee: Akzona Incorporated, Asheville, N.C.

[21] Appl. No.: 809,597

[22] Filed: Jun. 23, 1977

[30] Foreign Application Priority Data

Jun. 24, 1976 [DE] Fed. Rep. of Germany ....... 2628272

[51] Int. Cl.$^2$ ....................... C07C 179/14; C08K 5/14
[52] U.S. Cl. ..................................... 252/186; 252/95; 423/272; 423/273; 568/566; 568/560
[58] Field of Search ............. 252/186, 97; 260/610 D, 260/610 A; 423/272, 273

[56] References Cited

U.S. PATENT DOCUMENTS

| | | | |
|---|---|---|---|
| 2,453,070 | 11/1948 | Hyatt et al. | 260/610 D |
| 3,956,396 | 5/1976 | Mageli et al. | 260/610 D |

*Primary Examiner*—Benjamin R. Padgett
*Assistant Examiner*—Irwin Cluck
*Attorney, Agent, or Firm*—Francis W. Young; Robert F. Green

[57] ABSTRACT

A process for the preparation of uniform, stable diacyl peroxide compositions is disclosed. The process comprises reacting the corresponding acyl chloride with hydrogen peroxide in an alkaline aqueous medium in the presence of a desensitizing agent.

3 Claims, No Drawings

PROCESS FOR THE PREPARATION OF UNIFORM, STABLE DIACYL PEROXIDE COMPOSITION

BACKGROUND OF THE INVENTION

This invention relates to a process for the preparation of diacyl peroxide compositions having improved properties.

Diacyl peroxides are organic compounds, which find industrial application in the most varied areas, particularly in polymerization and oxidation reactions. Another very important area of application for such organic peroxides is the curing of unsaturated polyester resins. The organic peroxides may also be used in the preparation of acrylic resins.

Since pure organic diacyl peroxides are relatively unstable and tend to decompose, or even to disintegrate explosively, there have been numerous attempts to stabilize the peroxides and make them less dangerous to handle, so that they may be transported without extensive risk. Is is therefore known to mix organic peroxides with desensitizing agents. For example, customary desensitizing agents for organic peroxides are esters of phthalic acid, such as dioctyl phthalate, phosphoric esters, silicone oils, or chlorinated paraffins. The stabilized peroxides may be made up in the form of a solution, a paste, a dispersion, granules, or powder. The known dispersions and pastes are afflicted with the disadvantage that there may be demixing, so that the activity of the preparation is not uniform. Thus, heterogeneities may form due to settling and demixing, so that in the case of a product in a container, the upper layers may have different characteristics than those in the middle, or the lower portion of the container. However, industrial applications require a product of uniform quality.

Peroxides supplied in the form of dry powders show a tendency for dust formation and are also more impact-sensitive than material which is in the form of a paste. Solutions of mixed peroxides in esters of phthalic acid are described in U.S. Pat. No. 2,454,254. Among other things, a disadvantage of the process therein described is that the peroxide must first be prepared in a separate operation. Also, to prepare a stable solution, the peroxide must first be dried.

German Pat. No. 1,256,644, as well as German Patent Disclosure No. 1,768,199 describe processes for the preparation of anhydrous granules of organic peroxides through treatment of water-containing organic peroxides with desensitizing agents. Thereby, the water-containing crude peroxide has to be dispersed in at least 10 times the quantity of water. Instead of the crude peroxide dispersion one may also use the carboxylic chloride and hydrogen peroxide, which are required for its preparation, in an alkaline aqueous phase. Aside from the fact that working with such large quantities of water is cumbersome and attended by disadvantages, the product must later be made anhydrous. In addition, according to the processes pursuant to these two publications, attention must be paid to careful continuation of the solid components, so that frequently the use of special equipment, such as rollers, colloid mills, and the like, becomes unavoidable. Furthermore, the addition of organic solvents, such as benzene, is usually required. Furthermore, no pastes are obtained according to the teachings of the foregoing publications.

Finally, U.S. Pat. No. 3,538,011 describes the preparation of stabilized, anhydrous peroxide compositions, in which a softening agent with a melting point of more than 40° C. is used. The products described therein are obtained as granules or powder.

Although numerous processes for the preparation of stabilized peroxide mixtures of the most varied compositions have previously been described, there is still a need for a simpler, economical preparation method, resulting in products with improved characteristics.

It is therefore a purpose of this invention, to make available an especially simple, rapid, and economic process for the preparation of pastes containing diacyl peroxides. Another goal of the invention is a process for the preparation of such pastes having a low content of undesirable additives, such as chlorides. An additional goal of the invention is the preparation of storable pastes that are especially stable, do not have to be completely dried for purposes of storing and have little or no tendency to demix. It is furthermore a goal of the invention to prepare peroxide pastes which display an especially favorable crystal structure. It is still another purpose of the invention to provide peroxide pastes which may be blended with customary additives, such as pigments and other desirable additives without leading to premature decomposition. A final object of the present invention is to provide a process for the preparation of peroxide pastes which rapidly dissolve in unsaturated polyester resins.

SUMMARY OF THE INVENTION

It has now been found that uniform stable compositions of diacyl peroxides may be prepared by a process comprising reacting the corresponding acyl chloride with hydrogen peroxide in an alkaline aqueous medium at a temperature from about 0° C. to about 30° C. in the presence of from about 40 to about 70% of a desensitizing agent based on the weight of reacted acyl chloride until a substantial proportion of the diacyl peroxide has been formed and subsequently isolating a pasty composition.

DESCRIPTION OF THE PREFERRED EMBODIMENTS

The diacyl peroxides which are useful in the practice of the present invention include peroxides of the following formula:

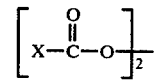

wherein X is selected from the group consisting of (1) alkyl radicals having from about 1 to about 12 carbon atoms,

wherein $R_1$ is an alkyl, cycloalkyl or aralkyl radical having from about 2 to about 17 carbon atoms and $R_2$ is hydrogen or an alkyl radical having from about 1 to about 4 carbon atoms,

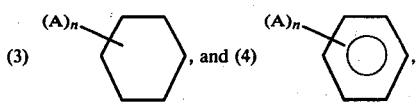

wherein A is an alkyl, cycloalkyl or aralkyl radical having from about 1 to about 12 carbon atoms or a halogen and n is an integer from 0 through 2. The corresponding acyl chloride will have the formula

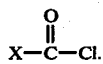

It should be understood that diacyl peroxides which do not literally belong to any of the foregoing formulae may be operable in the present invention. For example, diacyl peroxides in which X is an alkyl radical having from about 1 to about 12 carbon atoms also encompass such peroxides in which the alkyl group contains some functionality which does not interfere with the formation of the peroxide, such as an epoxide linkage and the like.

Particularly useful diacyl peroxides include benzoyl peroxide and its substituted analogs such as di-(2,4-dichlorobenzoyl) peroxide and di-(p-chlorobenzoyl) peroxide.

The term "desensitizing agent" as used herein refers to any composition which has a stabilizing effect on the peroxide but is otherwise essentially inert with respect to reacting with the peroxides, and has a flash point of no less than about 100° C., a boiling point of no less than about 150° C., and a solidification point below about 0° C. Customary desensitizing agents, such as esters of phthalic acid, silicone oils, and other compounds are especially suitable desensitizing materials. It is advantageous to carry out the reaction in the presence of about 40, preferably about 50, in particular about 70% by weight of the desensitizing agent, referred to the reacted quantity of acyl chloride.

The concentration of water present during the reaction of the acyl chloride with hydrogen peroxide is not critical. However, the reaction is usually carried out in the presence of less than 8 times, preferably less than 6 times the quantity of water, referred to the acyl chloride. The reaction may also be performed at a temperature which is incrementally increased. In an especially advantageous form of execution of the process pursuant to the present invention, dibenzoyl peroxide is prepared in a two-stage reaction, with the first stage being between 0° and 10° C., and the second stage between 10° and 20° C.

The alkaline aqueous medium may be formed by adding any basic material, such as soda lye, sodium hydroxide, potassium hydroxide, and the like, to water to form an aqueous solution having a basic pH. Of course, if $Na_2O_2$ is utilized to generate hydrogen peroxide and sodium hydroxide, no additional base need be added to the aqueous medium as a basic pH will naturally result.

A stoichiometric amount of hydrogen peroxide or a hydrogen peroxide generating material may be utilized in the process of the present invention. However, in the oxidation of the acid chloride to peroxide, use is generally made of a stoichiometric excess of hydrogen peroxide, or of the hydrogen peroxide generating material, such as sodium peroxide. The excess is frequently in the order of magnitude from 1 to 10 percent.

The compositions of the present invention may be characterized as pastes. By pastes, one understands a doughy, spreadable product. The viscosity of the same may vary within rather wide limits. Thus, depending upon the reaction conditions, the viscosity of the products may amount of a few poise, such as 2.5, or to about 1 million poise, as, for example, about 900,000. Usable pastes usually have viscosities of an order of magnitude of $10^4$ or $10^5$ poise. The viscosity may be determined with the aid of an ordinary rotation viscometer at 20° C. Naturally, the pastes can be blended well with customary additives, such as thixotropic agents, fillers, and pigments. Preparation of the water-containing paste can be carried out in the following manner. An aqueous solution of soda lye and hydrogen peroxide is placed in a suitable vessel and kept at a temperature below 30°, preferably below 25° C. Acid chloride and desensitizing agent are added to this solution drop by drop, either as a mixture, or separately. It is selfevident, that the desensitizing agent may already be added to the alkaline solution, so that only the acid chloride is metered in. The excess liquid is removed after termination of the reaction. The pastes are preferably washed with water. Separation of the pasty constituents is carried out pursuant to customary methods; for example, the excess liquid may be decanted. It is also possible to use a centrifuge with settling sump, on the bottom of which the pastes deposit. It is likewise possible to place the reaction mixture on a screen or filter, allowing the water to drain off. Washing of the pastes may be carried out by simply stirring with water, but other customary washing processes, for example, according to the countercurrent principle, may also be possible. Of course, the foregoing process may be employed in a continuous manner.

The process pursuant to the invention quickly leads to the desired product in an especially simple manner. It is not necessary to make the peroxide first as an intermediate product, then to isolate it, and only then to mix the peroxide with the desensitizing agent and the reaction time is extremely short. Furthermore it is not necessary to use large quantities, namely more than 10 times the quantity by weight of water in the reaction. Surprisingly, if the reaction is carried out in the presence of smaller quantities of water, one does not need more water for the washing of the pastes, than if the reaction is allowed to proceed in the presence of more than 10 times the quantity of water. Frequently, one may even manage with less washing liquid. Thus, in one washing operation, one may generally manage with a quantity of wash water amounting to 4 times, or even less, referred to the acyl chloride used. Also, the product prepared pursuant to the invention is obtained as an especially stable paste which shows no tendency to demix, so that quality fluctuations do not occur. Surprisingly, one obtains a very favorable crystal structure of the solid components of the paste, so that the processability of the pastes is excellent. In many cases the crystal structure differs from the ones existing in products made according to known processes. Thus, for example, in the preparation of pastes pursuant to the invention, which contain bis-(2,4-dichlorobenzoyl) peroxide and silicone oil as desensitizing agent, one obtains especially fine, oblong crystals, which differ in their form from pastes having the same, or similar composition, but were prepared according to customary methods.

In general, homogenizing of the product is not required. The pastes may be handled simply and without special precautions. The water content of the pastes may vary within wide limits. In general it is not above 15% and may be reduced to about 3 to 4% by purely mechanical means, such as centrifuging or pressing. Water content levels above 15% can also be reached, but then it may occasionally be necessary to add an emulsifying agent. The pastes may also be easily completely freed from water later on by drying, so that they may then also be used without trouble in areas such as the manufacture of Plexiglas ®, wherein a waterless product is required. As indicated certain substances which may be required as an additive, such as zinc stearate, can already be added to the reaction mixture to begin with, before the separation of the excess aqueous medium, so that an additional processing step can be saved.

The pastes prepared pursuant to the invention are excellently suited for the curing of unsaturated polyesters, in which they dissolve very rapidly after addition, so that short stirring times are sufficient. Due to the rapid and uniform dissolving of the paste, there will be no formation of agglomerates that might react violently with added activators, such as tertiary amines. Discolorations of, or turbidity in, the polyester resins will not be observed. The pastes may be stored very well and the product contains few impurities, such as chlorides. The process of the present invention is explained in more detail by way of the following non-limiting Examples.

EXAMPLE I

One liter of water in a glass vessel of a capacity of 5 liters is cooled to 4° C. with ice. 75 g of $Na_2O_2$ are dissolved in water with agitation and cooling. Subsequently, a mixture prepared in advance from 260 g benzoyl chloride and 200 g of a commercially available desensitizing agent on the basis of phthalic ester (Ultramoll TGN, from the firm Bayer A. G., Leverkusen) is added drop by drop to the sodium peroxide solution within 20 minutes. During the first 10 minutes the temperature is held at about 8° C. by means of the addition of ice. During the following 10 minutes ice is added so that the temperature can slowly rise to 15° C. Subsequently, the reaction mixture is for ½ hour allowed to continue reacting while being agitated, and 12 g of zinc stearate are stirred into the reaction mixture. The pasty constituents are separated from the excess liquid in a centrifuge with settling sump. After two washing cycles and dehydration by means of a centrifuge one obtains a homogeneous, stable benzoyl peroxide paste with about 50% peroxide, 43% desensitizing agent and a remainder of water and zinc stearate. The paste has a viscosity of 1800 poise.

EXAMPLE II 3.5 liters of water are placed in a glass vessel of 6 liter capacity. 480 g of 33% NaOH and 131 g of 50% $H_2O_2$ are added one after the other with agitation and cooling. Subsequently, a mixture of 800 g 2,4-dichlorobenzoyl chloride, 100 g dibutyl phthalate and 520 g silicone oil is added dropwise during 40 minutes. The temperature is held at 25° C. by means of ice. After that, the reaction mixture is allowed to continue reacting for a ½ hour with more agitation. This is followed by decanting and two washing steps by means of stirring in water. After dehydration on a filter, one obtains a paste containing about 50% peroxide, 46% desensitizing agent and 4% water.

EXAMPLE III 1200 ml of water are cooled to 4° C. with ice in a 5 liter stainless steel vessel. Then, 344 ml of 33% NaOH and 75 ml of 70% $H_2O_2$ are added and cooling with ice is continued. A mixture of 520 g benzoyl chloride, 148 g dibutyl phthalate and 89 g of the desensitizing agent of Example I is added within 20 minutes. During the first 10 minutes, ice is used to keep the temperature below 8° C., during the second 10 minutes below 15° C. While being agitated, the reaction mixture is allowed to continue reacting for another ½ hour. A pasty substance is formed, which, after removal of the water and two washing cycles with softened water, is mixed with 24 g of zinc stearate and 40 g of nonylphenyl ethylene glycol ether. The homogeneous, chemically and physically stable paste has a content of about 50% peroxide.

EXAMPLE IV

As in Example III, 120 ml of softened water with 344 ml of 33% NaOH and 75 ml of 70% $H_2O_2$ are brought to a temperature between 0 and 4° C. A mixture of 520 g of benzoyl chloride and 374 g dibutyl phthalate is added within 20 minutes with cooling and agitation. A thin paste is formed. After separation of the aqueous medium by means of decanting, and washing with water, 32 g of hydrophobic silicic acid are added. One obtains a stable mass which can still be poured.

EXAMPLE V 1.5 liters of water and 0.96 kg of 33% NaOH are mixed in a cylindrical vessel of 10 liter capacity. 0.275 kg of 50% $H_2O_2$ are added with additional stirring and cooling. Subsequently, one adds 1.2 kg of silicone oil. Now, 1.6 kg of 2,4-dichlorobenzoyl chloride are metered in during 40 minutes at a reaction temperature of 20° C. The heat of reaction is removed by cooling. After washing and separation of the aqueous phase one obtains a homogeneous paste with about 50% peroxide, 45% desensitizing agent and 5% water. The viscosity of the paste is 15,000 poise.

EXAMPLE VI 1.5 liters of water and 0.96 kg of 33% NaOH are mixed in a cylindrical vessel of 10 liter capacity. 0.275 kg of 50% $H_2O_2$ are added with additional stirring and cooling. Subsequently, 0.7 kg of silicone oil are added. After that, 1.07 kg of benzoyl chloride are metered in during 20 minutes, whereby the temperature of the reaction mixture is held at 4° C. during the first 10 minutes. After that, cooling is reduced to such an extent, that the reaction temperature rises to 16° C. With continued agitation, the reaction mixture is now allowed to continue reacting for 30 minutes. It is then decanted and washed twice by stirring with water. Following dehydration on a filter, one obtains a paste with about 50% peroxide and 40% desensitizing agent, the remainder being water and thixotropic agent.

What is claimed is:

1. A process for preparing uniform, stable pastes of diacyl peroxides having the formula,

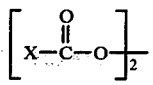

wherein X is selected from the group consisting of (1) alkyl radicals having from about 1 to about 12 carbon atoms,

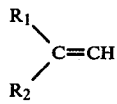 (2)

wherein $R_1$ is an alkyl, cycloalkyl or aralkyl radical having from about 2 to about 17 carbon atoms and $R_2$ is hydrogen or an alkyl radical having from about 1 to about 4 carbon atoms,

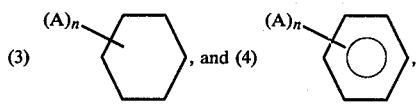

wherein A is an alkyl, cycloalkyl, or aralkyl radical having from about 1 to about 12 carbon atoms or a halogen and n is an integer from 0 through 2, comprising reacting the corresponding acyl chloride having the formula,

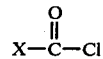

wherein X is defined above, with hydrogen peroxide in an alkaline aqueous medium at a temperature from about 0° C. to about 30° C. in the presence of from about 40 to about 70% of a desensitizing agent selected from the group consisting of compositions which have a stabilizing effect on the peroxide but are otherwise essentially inert with respect to reacting with the peroxide, said composition having a flash point of no less than about 100° C., a boiling point of no less than about 150° C., and a solidification point below about 0° C., based on the weight of reacted acyl chloride until a substantial proportion of the diacyl peroxide has been formed, and subsequently isolating the desired paste.

2. The process of claim 1 wherein the temperature is below about 25° C.

3. The process of claim 1 wherein less than 6 times the quantity of water, referred to the acyl chloride, is utilized.

* * * * *